June 11, 1940.  K. K. KUGLER  2,204,088
CLOSURE DEVICE FOR BATTERY BOX COVERS
Filed March 25, 1939
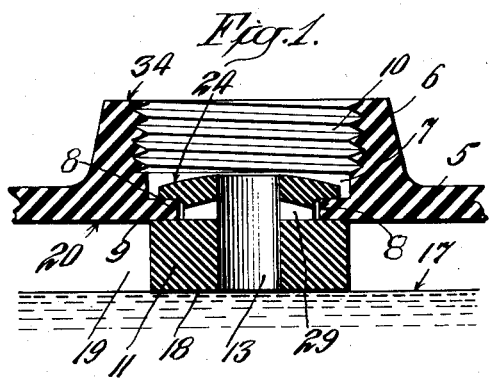
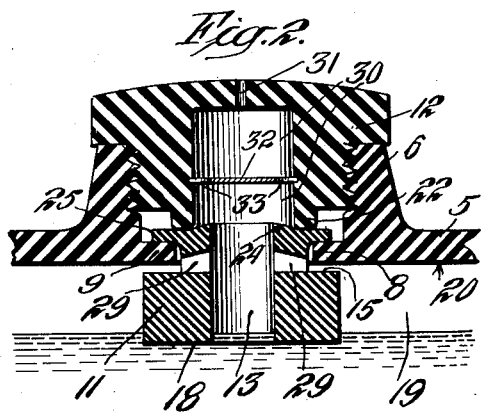
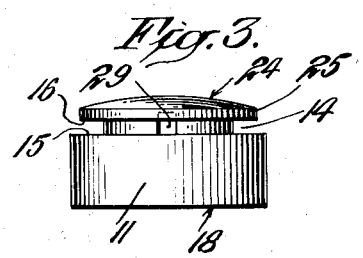
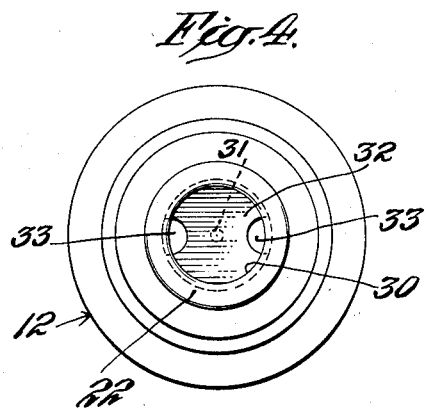
INVENTOR
KEITH K. KUGLER
BY
English Studwell
ATTORNEYS Patented June 11, 1940

2,204,088

UNITED STATES PATENT OFFICE 2,204,088

CLOSURE DEVICE FOR BATTERY BOX COVERS

Keith K. Kugler, Culbertson, Nebr., assignor to American Hard Rubber Company, New York, N. Y., a corporation of New York Application March 25, 1939, Serial No. 264,253

3 Claims. (Cl. 136—178)

The invention relates to an improvement in closure devices for the vent or filling holes of the covers of battery boxes. Such closure devices commonly perform a double function: In one position or condition they permit liquid to be introduced into the battery box up to a predetermined level; in another position or condition, after the requisite amount of liquid has been introduced into the battery box, they permit the escape of air or gases from the battery box.

Although the market provides several forms of satisfactorily operating closure devices for battery box covers, their cost of manufacture is considered by some as being too high for use in connection with battery boxes intended for cheaper or less costly grades of automobiles or other vehicles, and in various other installations. It is the object of the present invention to provide an improved closure device for battery box covers which will not only perform its functions satisfactorily, but which may be manufactured at a comparatively low cost. To this end the invention consists in the novel closure device for battery box covers hereinafter fully described and particularly pointed out in the appended claims.

In the accompanying drawing illustrating the preferred form of the invention, Fig. 1 is a longitudinal vertical section through the vent or filling hole portion of a battery box cover and of the resilient valve member in place, permitting the introduction of liquid into the battery box while preventing the escape of air or gas therefrom; Fig. 2 is a view similar to Fig. 1, but with the vent cap in place distorting the resilient valve sleeve so that air or gas may escape from the interior of the battery box out through the vent cap; Fig. 3 is a side elevation of the resilient valve sleeve; and Fig. 4 is a bottom plan view of the vent cap.

A portion of the battery box cover is indicated at 5. Rising from the top surface of the cover 5 is an annular boss 6 provided with a vertical opening 7 which permits liquids to be introduced into the battery box and also permits gases to escape from the battery box when the battery is in operation. The lower end of the hole 7 is contracted, as indicated at 8, and is surrounded by an annular flange-like shelf or ledge 9. The upper part of the boss 6 is provided with an internal thread, as indicated at 10.

The improved closure device for the battery box cover comprises two principal parts, a resilient sleeve-like valve member 11, preferably composed of soft rubber, and a vent cap 12, which may be composed of any suitable solid acid resistant material, such as hard rubber. Extending vertically through the center of the resilient valve member 11 is a hole 13 through which when the valve member is in place in the battery box cover, as shown in Fig. 1, liquids may be introduced into the battery box, up to a predetermined height. When the vent cap 12 is in place on the boss 6, as shown in Fig. 2, gas is permitted to escape from the interior of the battery box.

The upper end of the resilient sleeve-like valve member 11 is provided with a circumferential groove or recess 14, the diameter of the bottom of which is slightly less than the diameter of the opening 8. The width of the groove 14 is less than the thickness of the annular ledge 9, so that when the valve member is in place in the filling or vent hole 7 of the cover 5 the bottom side 15 and top side 16 of the groove 14 will tightly embrace the lower and upper surfaces of the annular ledge 9 and thereby form an airtight joint or seal between them, as clearly indicated in Fig. 1. In this position of the valve member with respect to the cover 5, liquid may be introduced into the battery box up to a predetermined level 17 coincident with the plane of the lower end 18 of the valve member, and not higher than that point because of the air entrapped in the space 19 between the liquid level 17 and the under surface 20 of the cover 5. It will be understood, of course, that when the liquid reaches the level 17, and more is poured into the battery box, it will fill the central opening 13 in the valve body. This will indicate to the operator that the predetermined amount of liquid has been introduced into the battery box. The sleeve-like valve member 11, being hollow and resilient may be compressed laterally so that it may be inserted into operative position in the opening 8 from the top or bottom sides of the cover 5.

The battery box may now be put in service by placing the vent cap 12 in operative position. For this purpose the vent cap is provided with an external thread adapted to screw into the internal thread 10 in the boss 6 of the battery box cover 5. The lower end of the vent cap 12 is reduced to form a button 22 adapted to engage with the upper convex surface 24 of the upper or head portion 25 of the valve member 11. Although the diameter of the button or reduced portion 22 of the lower end of the vent cap 12 may have any desired relation to the inner diameter of the opening 8 in the annular ledge or shelf 9, it is preferred that the two diameters be substantially the same. The engagement of the button 22 of the vent cap 12 with the convex upper surface 24 of the head 25 of the valve depresses or distorts the upper portion of the valve body and causes the lower surface 15 of the groove 14 to separate from the under surface 20 of the cover 5, as clearly indicated in Fig. 2. In this condition of the parts of the closure device, gases may now pass from the space 19 into the space between the surface 15 of the valve body and the lower surface 20 of the cover 5, thence through the radial vent holes 29 (which extend from the groove 14 into the central hole 13 of the valve body) and thence upwardly through the hollow interior 30 of the vent cap 12 and out through the restricted opening 31 in the top of the vent cap. To prevent escape of liquid from the battery box through the vent openings, a diaphragm 32 is interposed transversely in the hole 30, and is provided at opposite edges with the two relatively small openings 33.

In order that the reduced lower end or button 22 of the vent cap 12 may depress or distort the upper portion of the resilient valve sleeve 11 only the proper amount, the distances from the top surface 34 of the boss 6 to the upper surface of the ledge 9 and to the lower extremity of the button 22 are proportioned to the thickness or vertical dimension of the head or upper end 25 of the valve member.

When during the operation of the battery more liquid is required, the vent cap 12 is unscrewed and removed. Thereupon the resilient valve member 11 returns to the condition shown in Fig. 1, effectively sealing off the vent holes 29 and permitting liquid to be introduced into the battery box through the opening 13 only up to the level 17 coincident with the lower end 18 of the valve sleeve. When this level has been reached in the filling operation, the vent cap is again screwed into the position shown in Fig. 2, thereby forcing the lower portion of the valve member downwardly from engagement with the under surface of the ledge 9 and opening communication between the vent holes 29 and the space 19 in the battery box.

Having thus described the invention, what I claim as new is:

1. A closure device for a battery box adapted to contain liquid up to a predetermined level and having at its top a cover with a vertical hole therein, the upper part of the hole being threaded and the lower part of the hole being contracted and surrounded by a shelf-like annular flange, there being a gas-receiving space below the cover and above the level of the liquid, said closure device comprising a resilient valve sleeve provided with a circumferential groove having upper and lower sides adapted, respectively, to engage with the upper and lower surfaces of the flange, there being vent passages leading from the bottom of the groove to the interior of the sleeve, the engagement of the sides of the groove with the flange sealing the passageway through the vent passages from the gas-receiving space to the interior of the sleeve, the lower part of the sleeve extending a substantial distance below the flange and the upper end of the sleeve being convex and projecting upwardly beyond the flange, and a removable, threaded vent cap for closing the upper end of the hole in the cover and in that position engaging with and distorting the sleeve to disengage the lower side of the groove from the lower surface of the flange to establish communication between the gas-receiving space and the interior of the sleeve through the vent passages, said vent cap having a vent opening leading to the interior of the sleeve.

2. A closure device for a battery box adapted to contain liquid up to a predetermined level and having at its top a cover provided with a vertical hole with an inwardly extending shelf-like flange at the lower part thereof, there being a gas-receiving space below the cover and above the level of the liquid, said closure device comprising a resilient valve sleeve provided with a circumferential groove having upper and lower sides adapted, respectively, to engage with the upper and lower surfaces of the flange, the sleeve having vent passages leading from its hollow interior through the groove to its exterior and which are closed from the gas-receiving space by the engagement of the lower side of the groove with the under surface of the flange, the lower part of the sleeve extending a substantial distance below the flange and the upper part of the sleeve projecting upwardly beyond the flange, and a removable vent cap operatively connected with the upper part of the hole in the cover for closing the upper end of the hole and while in that part for engaging and depressing the upper part of the sleeve to disengage the lower side of the groove from the under surface of the flange, said vent cap having a vent passage leading to the interior of the sleeve.

3. A closure device for a battery box adapted to contain liquid up to a predetermined level and having at its top a cover provided with a vertical hole with an inwardly extending horizontal shelf-like flange at the lower part thereof, there being a gas-receiving space below the cover and above the level of the liquid, said closure device comprising a resilient valve sleeve mounted in the hole with circumferential portions of its exterior respectively in engagement with the upper and lower surfaces of the flange, the lower part of the sleeve extending a substantial distance below the flange and the upper part thereof projecting upwardly beyond the flange, the sleeve having vent passages leading from its hollow interior to a point superjacent to the portion of its exterior in engagement with the lower surface of the flange and being sealed thereby from the gas-receiving space, and a removable vent cap for closing the upper end of the hole in the cover, said vent cap and the upper part of the hole in the cover having cooperating means whereby the cap may be moved downwardly in the hole to engage with and distort the sleeve to disengage the sleeve from the lower surface of the flange to uncover the outer ends of the vent passages therein and thereby establish communication through them between the gas-receiving space and the interior of the sleeve, said vent cap having a vent communicating with the interior of the sleeve.

KEITH K. KUGLER.